US006915783B2

United States Patent
Mader et al.

(10) Patent No.: US 6,915,783 B2
(45) Date of Patent: Jul. 12, 2005

(54) METHOD FOR THE DAMPING OF MECHANICAL VIBRATIONS IN THE DRIVE TRAIN OF AN INTERNAL COMBUSTION ENGINE

(75) Inventors: Ralph Mader, Bad Abbach (DE); Michael Suedholt, Langquaid (DE)

(73) Assignee: Siemens Dematic AG, Nuremberg (DE)

( * ) Notice: Subject to any disclaimer, the term of this patent is extended or adjusted under 35 U.S.C. 154(b) by 44 days.

(21) Appl. No.: 10/148,749

(22) PCT Filed: Nov. 30, 2000

(86) PCT No.: PCT/DE00/04266

§ 371 (c)(1),
(2), (4) Date: Aug. 13, 2002

(87) PCT Pub. No.: WO01/40639

PCT Pub. Date: Jun. 7, 2001

(65) Prior Publication Data

US 2003/0168045 A1 Sep. 11, 2003

(30) Foreign Application Priority Data

Dec. 3, 1999 (DE) .......................... 199 58 251

(51) Int. Cl.[7] .................................................. F02P 5/06
(52) U.S. Cl. ............................ 123/406.24; 123/192.1; 123/406.52
(58) Field of Search .................... 123/192.1, 406.24, 123/406.25, 406.52, 399

(56) References Cited

U.S. PATENT DOCUMENTS

| 4,289,102 A | * | 9/1981 | Katsumata et al. ..... 123/406.21 |
| 4,530,328 A | * | 7/1985 | Komurasaki ........... 123/406.36 |
| 4,621,602 A | * | 11/1986 | Furuyama .............. 123/406.16 |
| 4,852,537 A | * | 8/1989 | Nagano et al. ........ 123/406.25 |
| 5,080,066 A | * | 1/1992 | Takeno et al. ......... 123/406.12 |
| 5,448,976 A | * | 9/1995 | Treinies et al. ........ 123/406.23 |
| 5,759,133 A | * | 6/1998 | Treinies et al. ............. 477/110 |
| 5,884,605 A | * | 3/1999 | Nagaishi et al. ....... 123/339.11 |
| 6,065,449 A | * | 5/2000 | Fukuma ..................... 123/436 |
| 6,343,586 B1 | * | 2/2002 | Muto et al. ............ 123/406.25 |
| 6,418,907 B1 | * | 7/2002 | Frech et al. ................ 123/325 |
| 6,546,328 B1 | * | 4/2003 | Slicker ....................... 701/111 |
| 2002/0043244 A1 | * | 4/2002 | Wiedenhoft et al. ... 123/406.23 |

FOREIGN PATENT DOCUMENTS

| JP | 59529 | * | 5/1979 | ............ F02P/5/08 |
| KR | 359852 | * | 6/2000 | ............ F02P/5/16 |

* cited by examiner

*Primary Examiner*—Hai Huynh
(74) *Attorney, Agent, or Firm*—Baker Botts LLP

(57) ABSTRACT

A method for the damping of mechanical vibrations in the drive train of an internal combustion engine by detection of vibration excitations in the drive train, and adjustment of the ignition angle of the internal combustion engine in the event of the occurrence of a vibration excitation in the drive train, in order to damp the vibration in the drive train, the adjustment of the ignition angle taking place in a flexible way.

9 Claims, 3 Drawing Sheets

METHOD FOR THE DAMPING OF MECHANICAL VIBRATIONS IN THE DRIVE TRAIN OF AN INTERNAL COMBUSTION ENGINE

CROSS-REFERENCE TO RELATED APPLICATIONS

This is a national application for International Application No. PCT/DE00/04266 which was filed on Nov. 30, 2000 and which published in German on Jun. 7, 2001, which in turn claims priority from 199 58 251.3, which was filed on Dec. 3, 1999.

FIELD OF THE INVENTION

The invention relates to a method for the damping of mechanical vibrations in the drive train of an internal combustion engine.

BACKGROUND OF THE INVENTION

The drive train of a motor vehicle between the internal combustion engine and the driving wheels necessarily has certain elasticity, and therefore, in the event of a load change, undesirable vibrations may occur in the drive train. It is known to damp vibrations of this kind after a predetermined idle time has elapsed following a load change, by reducing the ignition angle of the internal combustion engine by a defined angle for a predetermined effective duration, after which the ignition angle is returned to the original value. This type of ignition angle control has a beneficial influence on the drive torque of the internal combustion engine, and thus damps the vibrations in the drive train which are excited by the load change. One disadvantage, however, of this method is that manufacturing tolerances, aging effects of the engine suspension, and the current transmission ratio during the load change are not taken into account. Thus, over the course of time, the suspension of the internal combustion engine becomes softer on account of aging effects, with the result that the tendency of the drive train to vibrate increases. Furthermore, in transmission engines, load changes have a greater effect in low gears than in high gears.

DE 42 32 204 A1, DE 42 22 298 A1, DE 40 13 943 C2, DE 40 09 792 A1 and U.S. Pat. No. 5,452,698 disclose methods for the damping of mechanical vibrations in the drive train of an internal combustion engine, in which the ignition angle adjustment takes place in a flexible way as a function of the operating state of the internal combustion engine, or as a function of the intensity of the vibration. A disadvantage of these methods, however, is that vibration suppression commences only when a vibration has already occurred in the drive train, since the rotational speed of the crank shaft is evaluated in order to determine a vibration in the drive train. Consequently, these methods make it possible to damp only vibrations which have already occurred in the drive train, whereas it is not possible, or is possible only to an unsatisfactory extent, to avoid a vibration occurring in the drive train.

Furthermore, DE 39 30 487 A1 discloses a method for the damping of mechanical vibrations in the drive train of an internal combustion engine, in which a fuel injection pulse width is detected, so that an acceleration operation can be detected even before the occurrence of mechanical vibrations in a drive train. The damping method known from this reference commences only when the measurement of the fuel injection pulse width announces an imminent acceleration operation, but the ignition angle adjustment takes place independently of the fuel injection pulse width and is fixed as a function of other variables. This method also has the disadvantage that the actual ignition angle adjustment, and consequently the damping action, are independent of the injection quantity, and thus there is no flexible quantitative adaption of the damping action to the injection quantity.

Finally, DE 37 17 368 C2 discloses a method for the damping of mechanical vibrations in the drive train of an internal combustion engine, in which the throttle valve position is detected, so that an imminent acceleration operation can be timely detected. In the event of an acceleration, the ignition angle is adjusted in a flexible way, with the duration of the ignition angle adjustment depending on the change in the throttle valve position, and consequently on the intensity of the imminent acceleration operation. This method has the disadvantage that only the duration of the ignition angle adjustment is dependent on the throttle valve position, and the adaption of the vibration damping to the intensity of the imminent acceleration operation takes place in an unsatisfactory manner.

SUMMARY OF THE INVENTION

The object of the present invention is to improve the known methods for the damping of mechanical vibrations in the drive train of an internal combustion engine, so that the vibration damping is adapted as optimally as possible to the intensity of the imminent acceleration operation. While the present invention embraces the general teaching of not rigidly controlling the ignition angle reduction in the event of a load change, but flexibly controlling it as a function of the respective boundary conditions, so that vibration excitation acting on the drive train of the internal combustion engine is detected, and the reduction in the ignition angle in the event of a load change is flexibly controlled as a function of the vibration excitation.

The vibration excitation is detected by measuring the set angle of the throttle valve of the internal combustion engine. In the event of a sudden opening of the throttle valve, and of a consequently expected sudden increase in the drive torque of the internal combustion engine, the ignition angle adjustment is counter controlled at an early stage in order to avoid the formation of vibrations in the drive train.

Furthermore, there is also the possibility of detecting a vibration excitation in the drive train by determining the operating state of the internal combustion engine. Thus, for example, the rotational speed of the internal combustion engine can be measured in order to calculate the change in time of the rotational speed. Thus, a load change may be inferred in the event of a sudden rotational speed change.

In addition to a flexible detection of a load change in the drive train, the reaction to the load change also takes place in a flexible way. For example, it is possible to adapt the amount of the ignition angle reduction to the amount of the load change. This affords the advantage that aging effects, for example on the suspension of the internal combustion engine, are taken into account. Further, the operating state of the internal combustion engine, or of the entire system consisting of an internal combustion engine, drive train and transmission, is also taken into account.

In another embodiment of the present invention, before the reaction to a load change, the operating state of the internal combustion engine is determined, for example, the rotational speed, the rotational speed change, the throttle valve position, the change in the throttle valve position, the mass air flow, the intake air temperature, the coolant temperature, the vehicle speed and/or the transmission ratio of the transmission are measured in order to adjust the ignition angle of the internal combustion engine in a flexible way as a function of one or more of these variables.

Within the framework of the above-described flexible ignition angle adjustment, whereby said adjustment is a function of the load change, or of the operating state of the internal combustion engine, the ignition angle parameters may be varied. One possibility is to vary the idle time between the occurrence of a load change and the change in the ignition angle as a function of the measured values. Another possibility provides for varying the amount of ignition angle adjustment correspondingly. Moreover, there is also the possibility of adapting the duration of the ignition angle adjustment according to the measured values, in order to achieve optimum damping of the vibrations in the drive train which are excited by a load change. Finally, the type of return of the ignition angle to the original value may also be controlled, in order to bring about optimum damping in the drive train. These types of ignition angle control may be employed alone or in combination.

BRIEF DESCRIPTION OF THE DRAWINGS

The present invention is described in greater detail below in the context of the preferred exemplary embodiments of the invention, and with reference to the drawings in which.

DETAILED DESCRIPTION OF THE INVENTION

Figure 1:
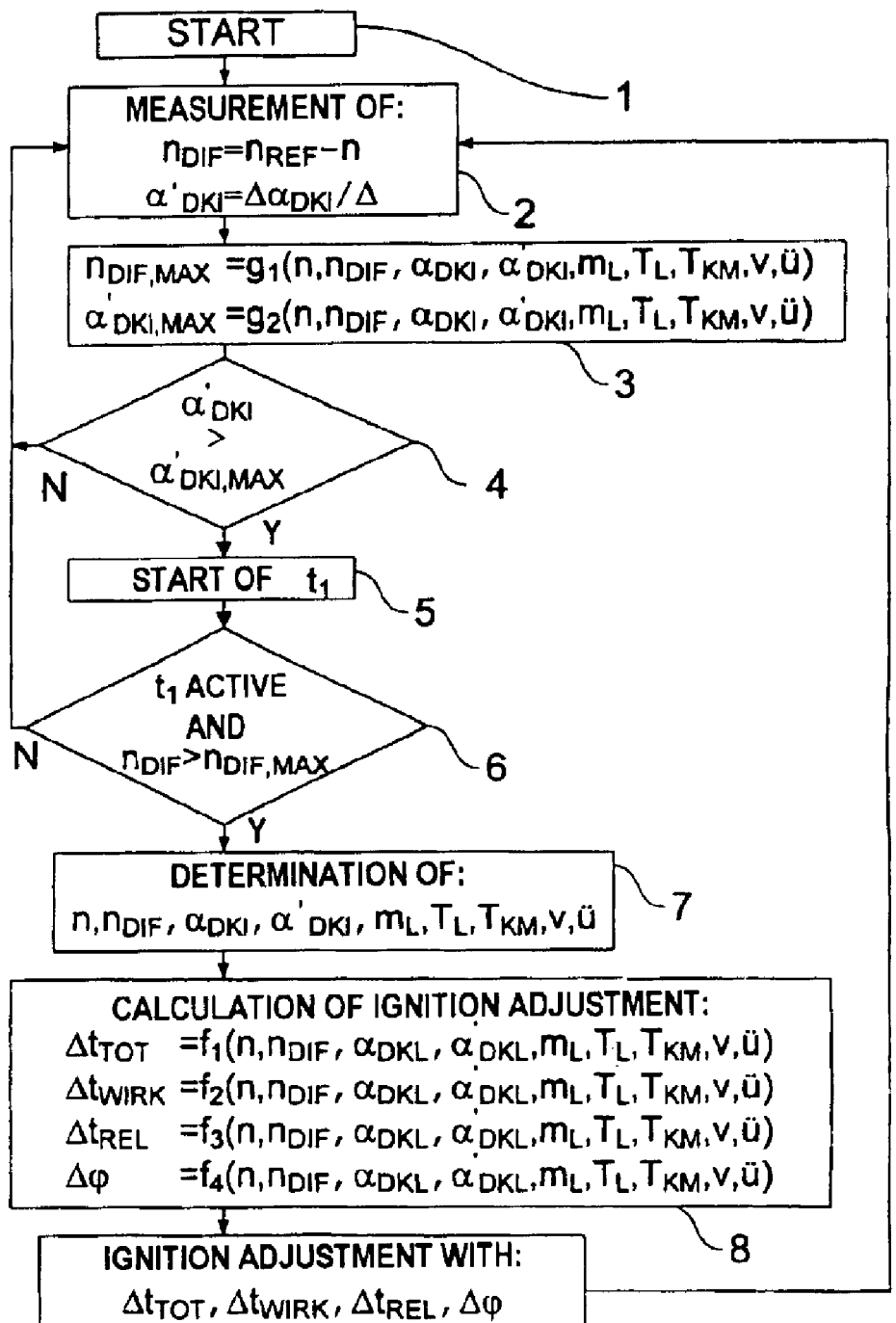
FIG. 1 illustrates the method according to the invention in the form of a flow chart.

In the method for the damping of vibrations in the drive train of an internal combustion engine, illustrated in FIG. 1, after a starting step 1, the change in time $n_{dif}$ in the rotational speed of the drive train and the change in time $\alpha'_{DK1}$ of the throttle valve angle are determined in step 2, so that a load jump in the drive train can be detected.

In step 3, threshold values $n_{dif,max}$ and $\alpha'_{DK1,max}$, respectively, for the rotational speed change, and for the change in the throttle valve position are read out from a multidimensional characteristic diagram as a function of the operating state of the internal combustion engine. The determination of the threshold values is in this case dependent on the rotational speed n, the change in the rotational speed $n_{dif}$, the throttle valve position $\alpha_{DK1}$, the change in the throttle valve position $\alpha'_{DK1}$, the air mass $m_L$, the air temperature $T_L$, the coolant temperature $T_{KM}$, the vehicle speed v and the transmission ratio.

In step 4, a check is made as to whether the driver of the motor vehicle has suddenly actuated the gas pedal, thus leading to an opening of the throttle valve. For this purpose, the measured change in the throttle valve position $\alpha'_{DK1}$ is compared with the threshold value $\alpha'_{DK1,max}$. In the event of undershooting the threshold value $\alpha'_{DK1,max}$, there is obviously no load change, so that there is a return to step 2. Overshooting the threshold value $\alpha'_{DK1,max}$ indicates that the driver of the motor vehicle has suddenly accelerated the motor vehicle, so that a rise in the drive torque of the internal combustion engine will be expected and factored-in. In the event of overshooting the predetermined threshold value, therefore, the method proceeds to step 5, where a timespan $t_1$ is started.

During the timespan $t_1$, in step 6, the measured rotational speed change $n_{dif}$ is compared continuously with the previously calculated threshold value $n_{dif,max}$, in order to check whether the sudden rise in the drive torque of the internal combustion engine also leads to a load change, which is expressed in a corresponding rise of the rotational speed. In the event of undershooting the predetermined threshold value $n_{dif,max}$, it is assumed that the increase in the drive torque does not lead to a load change, and the method returns to step 2.

In step 7, the operating state of the internal combustion engine is determined by measuring the rotational speed n, the change in the rotational speed $n_{dif}$, the throttle valve position $\alpha_{DK1}$, the change in the throttle valve position $\alpha'_{DK1}$, the air mass $m_L$, the air temperature $T_L$, the coolant temperature $T_{KM}$, the vehicle speed v and the transmission ratio are measured.

Figure 2:
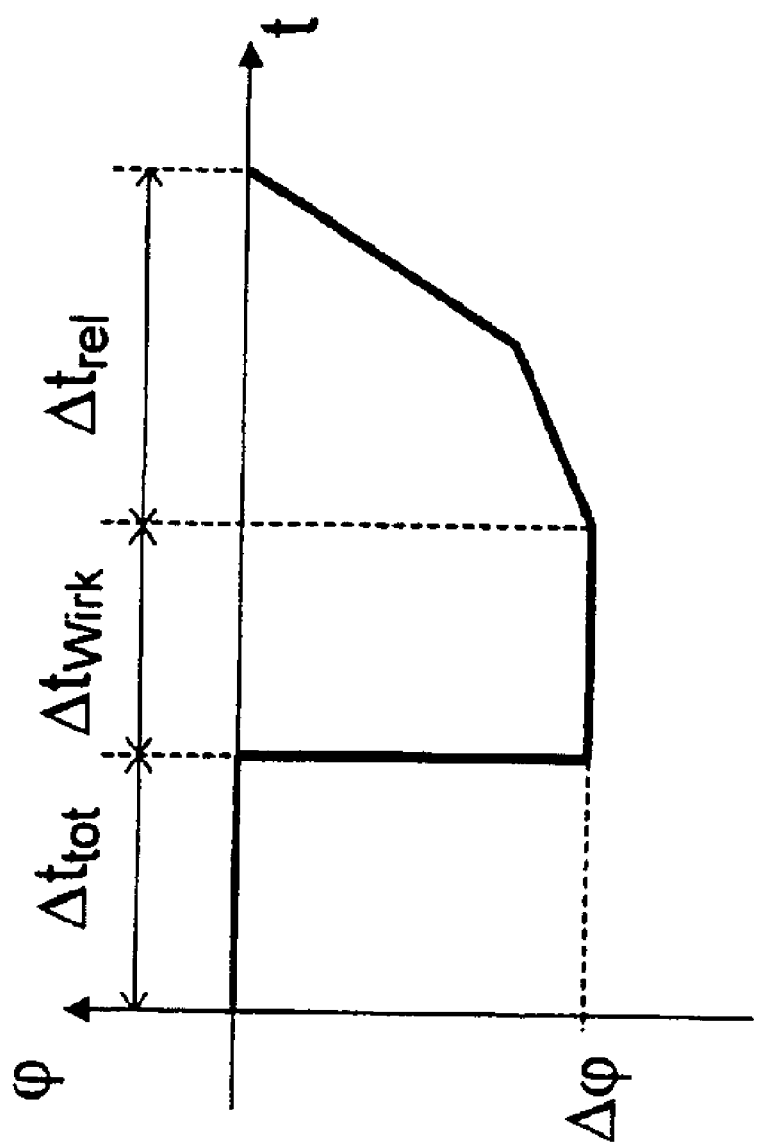
FIG. 2 illustrates the profile of the ignition angle after a load change.

In step 8, the parameters $\Delta t_{TOT}$, $\Delta t_{WIRK}$, $\Delta t_{REL}$ and $\Delta \phi$ of the ignition angle adjustment are calculated. The physical importance of which is clear from the ignition angle profile, illustrated in FIG. 2, after a load change. The calculation of the individual control parameters for the ignition angle control is carried out, here, in each case as a function of the operating state of the internal combustion engine, by the parameter value being read out from a multidimensional characteristic diagram.

One parameter for the ignition angle adjustment is in this case the idle time $\Delta t_{TOT}$ which, after a detected load change, is first passed before the ignition angle is reduced. A further parameter is the angle $\Delta \phi$ by which the ignition angle is reduced after the idle time $\Delta_{TOT}$ has elapsed. Furthermore, within the framework of this embodiment of the method according to the invention, the effective duration $\Delta t_{WIRK}$, which indicates the period of time for which the ignition angle is reduced, is also controlled. Finally, the return time $\Delta t_{REL}$ is also controlled, which indicates the time within which the ignition angle is returned to the normal value again after the effective duration $\Delta t_{WIRK}$ has elapsed. In the illustrated example, the return of the ignition angle to the original value takes place in two time segments, within which the ignition angle in each case behaves linearly in relation to time.

After the parameters for the ignition angle adjustment have been determined, the actual ignition angle adjustment then takes place in step 9, in order to damp the vibration in the drive train induced by the load change. Subsequently, there is a return to step 2, so that the next load change can be detected.

Figure 3:
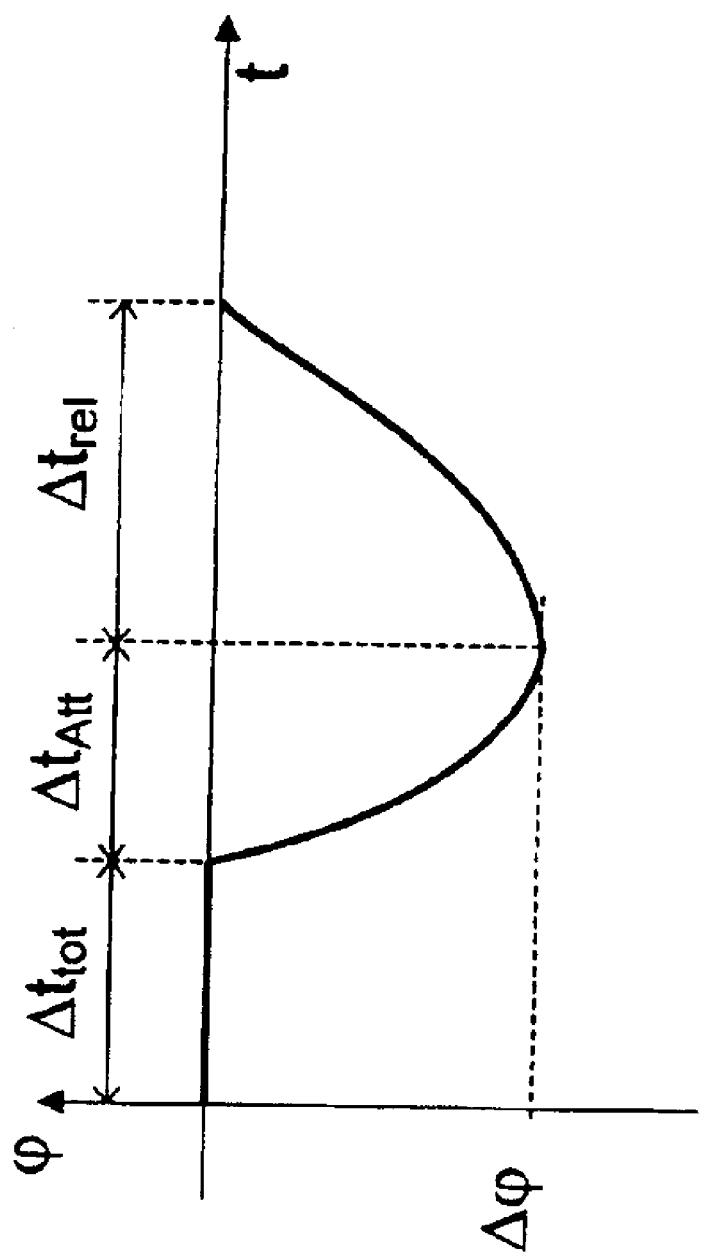
FIG. 3 illustrates an alternative profile of the ignition angle after a load change.

Figure 3 shows an alternative profile of the ignition angle after a load change, in which the ignition angle profile is adapted optimally to the load change and therefore does not behave linearly in relation to time.

The invention is not restricted in its implementation in the foregoing preferred embodiments. Variations may be envisioned for embodiments which are of a different type, but which are susceptible to the method in accordance with the present invention.

What is claimed is:

1. A method for damping mechanical vibrations in a drive train of an internal combustion engine, comprising detecting vibration excitations in the drive train by determining a rotational speed variation of the drive train and by determining a throttle valve position or a change in the throttle valve position of the internal combustion engine flexibly and as a function of the vibration excitation wherein an ignition angle size is varied as a function of the throttle valve position, or a change in the throttle valve position, further comprising determining an operating state of the internal combustion engine by detecting variables selected from the group consisting of rotational speed, rotational speed change, rotational speed difference, throttle valve position, standardized charge, change in the throttle valve position, change in the standardized charge, mass air flow, the intake air temperature, coolant temperature, vehicle speed and/or the transmission ratio; and further adjusting the ignition angle in a flexible way as a function of at least one of these variables.

2. The method according to claim 1, wherein the ignition angle of the internal combustion engine is adjusted after an idle time in which a detection of a vibration excitation has elapsed, the idle time being defined in a flexible way as a function of the vibration excitation and/or of the operating state of the internal combustion engine.

3. The method according to claim 1, wherein after the detection of a vibration excitation, the ignition angle is adjusted by a predetermined correction angle, the correction angle being defined in a flexible way as a function of the vibration excitation and/or of the operating state of the internal combustion engine.

4. The method according to claim 1, wherein after the detection of a vibration excitation, the ignition angle is adjusted only for a predetermined effective duration, the effective duration being defined in a flexible way as a function of the vibration excitation and/or of the operating state of the internal combustion engine.

5. The method according to claim 4, further comprising resetting the ignition angle after the effective duration has elapsed in a flexible way as a function of the vibration excitation and/or of the operating state of the internal combustion engine.

6. The method according to claim 5, wherein after the effective duration has elapsed, the ignition angle is reset in segments linearly over time.

7. The method according to claim 6, wherein after the effective duration has elapsed, the ignition angle is reset in a first time segment with a first gradient, and in a subsequent second time segment with a second gradient, the gradient being greater in the second segment than in the first segment.

8. The method according to claim 1, further comprising adjusting the ignition angle only when the internal combustion engine is operating in a part-load range.

9. The method according to claim 1, further comprising adjusting the ignition angle only when the internal combustion engine is operating in an overrun mode.

* * * * *